United States Patent [19]

Walker et al.

[11] Patent Number: 4,683,954

[45] Date of Patent: Aug. 4, 1987

[54] COMPOSITION AND METHOD OF STIMULATING SUBTERRANEAN FORMATIONS

[75] Inventors: Michael L. Walker; William G. F. Ford; Walter R. Dill; Ricky D. Gdanski, all of Duncan, Okla.

[73] Assignee: Halliburton Company, Duncan, Okla.

[21] Appl. No.: 904,736

[22] Filed: Sep. 5, 1986

[51] Int. Cl.$^4$ .................. E21B 43/267; E21B 43/27
[52] U.S. Cl. ............................... 166/307; 166/308; 166/902
[58] Field of Search ............... 166/271, 305.1, 307, 166/308, 902; 252/8.553

[56] References Cited

U.S. PATENT DOCUMENTS

| | | |
|---|---|---|
| 2,175,079 | 10/1939 | Dow . |
| 2,175,081 | 10/1939 | Grebe . |
| 2,175,095 | 10/1939 | Stoesser ........................... 252/8.553 |
| 3,142,335 | 7/1964 | Dill et al. ........................ 252/8.553 |
| 3,752,233 | 8/1973 | Svaldi et al. .................. 166/305.1 X |
| 4,151,098 | 4/1979 | Dill et al. ........................ 252/8.553 |
| 4,167,214 | 9/1979 | Street, Jr. ............................ 166/307 |
| 4,213,866 | 7/1980 | Ashby et al. ..................... 252/8.553 |
| 4,317,735 | 3/1982 | Crowe et al. ..................... 252/8.553 |
| 4,574,050 | 3/1986 | Crowe et al. ..................... 252/8.553 |
| 4,585,065 | 4/1986 | Penny et al. ........................ 166/308 |

*Primary Examiner*—George A. Suchfield

*Attorney, Agent, or Firm*—Robert A. Kent

[57] ABSTRACT

A method and composition for stimulating subterranean formations containing iron deposits. The composition comprises an admixture of (i) at least one member selected from the group consisting of hydroxylamine hydrochloride, hydroxylamine hydrobromide, hydroxylamine sulfate, hydrazine monohydrochloride, hydrazine dihydrochloride, hydrazine sulfate, hydrazine monobromide, hydrazine dibromide, hydrazine monoiodide, hydrazine diiodide and hydroquinone together with (ii) at least one member selected from the group consisting of gluconodeltalactone, citric acid, salts of citric acid, ethylenediaminetetraacetic acid, salts of ethylenediamianetetraacetic acid, nitrilotriacetic acid, salts of nitrilotriacetic acid, hydroxyethylethylenediaminetriacetic acid, and salts of hydroxyethylethylenediaminetriacetic acid and (iii) a catalytic amount of a solubilized salt of a compound capable of providing cupric, cuprous, nickel, zinc ions or mixtures thereof. The method comprises contacting the subterranean formation in an appropriate manner with the above-described composition present in an amount sufficient to sequester iron. When the treating fluid used in stimulating the subterranean formation is substantially non-acidic, the compounds of group (ii), above, can be omitted from the above-described composition and iron still is sequestered.

20 Claims, No Drawings

COMPOSITION AND METHOD OF STIMULATING SUBTERRANEAN FORMATIONS

BACKGROUND OF THE INVENTION

1. Field of the Invention

The present invention relates to the stimulating of subterranean formations surrounding oil wells, gas wells, water wells, injection wells and similar boreholes.

2. Brief Description of the Prior Art

The flow of oil from a subterranean formation to a well bore depends, among other factors, upon the permeability of the formation. Often permeability is not sufficient to allow a desired flow rate of fluids, such as, crude oil, natural gas and so forth from the formation. In such a case, the formation can be treated to increase its permeability.

Acid treating has been widely employed for carrying out the treatments in subterranean oil, gas, or water producing formations. Such acidizing treatments have been used primarily to increase the productivity of oil and gas from a calcareous formation by bringing about the removal of reactive materials from naturally occurring fractures and pore spaces in the formation whereby the sizes thereof are increased. The usual technique of acidizing the formation comprises introducing a nonoxidizing acid into the formation under sufficient pressure to force the acid into the formation where it reacts with acid soluble components of the formation and thereby enlarges the interstices of the formation with an attendant increase in permeability.

Acidizing fluids can also be utilized during the stimulation of a well to remove acid soluble scales present in the well bore or to dissolve fine particles which have been formed in the perforating process and are present in the vicinity of the well bore. Generally, this technique involves placing a small quantity of acid in a desired portion of the well bore and allowing the acid to react with the scale deposits that are desired to be removed. Alternatively, the acid may be circulated across the perforations or formation face to dissolve the unwanted deposits.

Hydraulic fracturing also can be employed to increase the production of fluids from a subterranean formation; and accordingly many methods and compositions useful for hydraulically fracturing a subterranean well formation penetrated by a well bore have been developed. Commonly, in the art of hydraulic fracturing, a fluid is introduced into the formation sought to be fractured by a conduit, such as tubing or casing, disposed in a well bore. The fluid is introduced at a rate and pressure sufficient to produce a fracture in the formation and to extend the produced fracture from the well bore into the formation. The fluid can include a propping agent, which results in placement of the propping agent within the fracture thus produced. Following the fracturing treatment, the introduced fluid is recovered from the formation, but the proppant remains in the produced fracture to thereby prevent the complete closure thereof and to form a conductive channel extending from the well bore into the formation. Combination fracture acidizing processes are well known in the art.

The presence of iron in subterranean formations presents a troublesome problem during the stimulation of the formations.

Whenever a formation containing iron salts or oxides is acidized, acid soluble iron compounds are dissolved at first by the acid; but such compounds remain dissolved in the acidic solution only as long as the pH is less than that at which they are normally precipitated. As the acid solution continues to act upon the formation deposits and becomes spent, the pH of the solution increases to about 4 to 5. Ferric iron compounds begin to precipitate at a pH of about 2.5 and are precipitated when the pH is about 3.5. Thus, the acid solution when spent, no longer retains the ferric iron in the solution and the resulting iron precipitates often reduce permeability by objectionably plugging, clogging or otherwise obstructing the pore spaces and other openings providing fluid passageways in the well stratum.

A problem encountered in the fracturing of a subterranean formation is that the water which is present in the formation can contain dissolved ferrous ions. If the fracturing fluid that is injected into the formation contains oxygen, the oxygen will oxidize the dissolved ferrous ions to ferric ions and this results in precipitation of the ferric ions when the pH of the formation water is greater than 2.5. This, also causes objectionable plugging, clogging or obstruction of the pore spaces and other openings in the fluid passageways of the subterranean formation.

Still another problem encountered in stimulating a subterranean formation is the presence of iron in the aqueous fluids that are used for stimulating the formation. These aqueous fluids are frequently mechanically blended in order to insure proper mixing of the components in the fluid and are pumped into the subterranean formation. During the blending and pumping of the stimulating fluids, any ferrous ions present in these stimulating fluids may be oxidized to ferric ions. Since these ions begin to precipitate at a pH of about 2.5, and are precipitated when the pH is about 3.5, the stimulating fluid can deposit the ferric ions on the pore surfaces of the subterranean formation and thus cause low permeability of the formation.

In order to prevent the precipitation of the iron compounds from spent acidizing solutions, sequestering additives have heretofore been utilized in acidizing solutions. For example, acetic acid has been used as a pH control agent for keeping iron and the like in solution in spent acid. U.S. Pat. No. 3,142,335, which is assigned to the assignee of the present invention discloses an iron sequestering additive for use with hydrochloric acid solutions comprised of a mixture of citric acid or a salt thereof, and a low molecular weight organic acid or salt thereof, such as acetic acid or formic acid.

Numerous other patents disclose the use of chelating agents for preventing the deleterious effects of dissolved iron in well treatments involving aqueous strong acids. U.S. Pat. No. 2,715,081 discloses an acidizing composition made up of a strong mineral acid containing sulfurous acid, which prevents the precipitation of iron in the formation. U.S. Pat. No. 2,175,079 suggests that the inclusion within an acidizing fluid of a material such as lactic acid, ammonium acetate, glycine, glycolic acid, citric acid or the like keeps the iron compounds dissolved by the acid in the solution. U.S. Pat. No. 3,150,081 discloses the use of hydroxyacetic acid and citric acid to prevent the precipitation of iron during acidizing operations.

U.S. Pat. No. 4,574,050 discloses the use of ascorbic acid, erythorbic acid, their salts or γ-lactone of such acids to prevent the precipitation of iron during acidizing operations. It would be desirable to provide a composition and method for preventing the precipitation of iron during the stimulation of subterranean formations.

SUMMARY OF THE INVENTION

Surprisingly, it has been found that an admixture of at least one member selected from the group consisting of hydroxylamine hydrochloride, hydroxylamine hydrobromide, hydroxylamine sulfate, hydrazine monohydrochloride, hydrazine dihydrochloride, hydrazine sulfate, hydrazine mono or dibromide, hydrazine mono or diiodide and hydroquinone together with at least one member selected from the group consisting of gluconodeltalactone, isomers of gluconodeltalactone, citric acid, salts of citric acid, ethylenediaminetetraacetic acid, salts of ethylenediaminetetraacetic acid, nitrilotriacetic acid, salts of nitrilotriacetic acid, hydroxyethylethylenediaminetriacetic acid and salts of hydroxyethylethylenediaminetriacetic acid and a catalytic amount of a solubilized salt of a compound capable of providing at least one member selected from the group consisting of cupric, cuprous, nickel and zinc ions in an aqueous stimulating fluid will substantially reduce any ferric ions in the stimulating fluid to ferrous ions and scavenge at least a portion of the oxygen present in the aqueous fluid to substantially prevent the oxidation of the ferrous ions to ferric ions and thus substantially prevent the precipitation of iron on the pore surfaces of the subterranean formation.

When the stimulating fluid is substantially non-acidic, an admixture of at least one member selected from the group consisting of hydroxylamine hydrochloride, hydroxylamine hydrobromide, hydroxylamine sulfate, hydrazine monohydrochloride, hydrazine dihydrochloride, hydrazine sulfate hydrazine mono or di bromide, hydrazine mono or dioxide and hydroquinone together with a catalytic amount of a solubilized salt of a compound capable of providing cupric, cuprous, nickel, zinc ions or mixtures thereof in the stimulating fluid will substantially reduce any ferric ions in the stimulating fluid to ferrous ions and thus substantially prevent the precipitation of any iron that is present on the pore surfaces of the subterranean formation.

DESCRIPTION OF THE PREFERRED EMBODIMENT

The present invention provides a new method of stimulating a subterranean formation employing a new and improved composition for stimulating the subterranean formation. Briefly, the formation stimulating fluid of the present invention is a composition having an admixture of at least one member selected from the group consisting of hydroxylamine hydrochloride, hydroxylamine hydrobromide, hydroxylamine sulfate, hydrazine monohydrochloride, hydrazine dihydrochloride, hydrazine sulfate, hydrazine mono or dibromide, hydrazine mono or diiodide and hydroquinone together with at least one member selected from the group consisting of gluconodeltalactone, isomers of gluconodeltalactone, citric acid, salts of citric acid, ethylenediaminetetraacetic acid, salts of ethylenediaminetetraacetic acid, nitrilotriacetic acid, salts of nitrilotriacetic acid, hydroxyethylethylenediaminetriacetic acid, and salts of hydroxyethylethylenediaminetriacetic acid and a catalytic amount of a solubilized salt of a compound capable of providing cupric, cuprous, nickel, zinc ions or mixtures thereof incorporated into the composition. The method of the invention comprises contacting the subterranean formation with the above-described composition.

One broad aspect of the invention comprises using the above-described composition in an aqueous fracturing fluid. In the practice of the invention, the present composition is incorporated into an aqueous fracturing fluid and injected down the well at a pressure sufficient to fracture the formation employing conventional pumping equipment and procedures. If desired, the fracturing fluid used to practice the invention can be injected into a selected portion or portions of the formation. Said selected portion(s) of the formation can be isolated by applying one or more well packers at proper locations or by other methods known in the art.

Another embodiment of the invention comprises using the composition of the present invention as a sequestering additive in acidizing compositions and methods of acidizing subterranean well formations, which is very effective in preventing the precipitation of iron in the formations.

The acidizing compositions for stimulating subterranean formations containing iron deposits are comprised of aqueous acids to which the above-described sequestering agent is added. The above-described sequestering agent also is useful in aqueous fluids utilized to stimulate subterranean formations containing iron deposits.

As noted above, the admixture of at least one member selected from the group consisting of hydroxylamine hydrochloride, hydroxylamine hydrobromide, hydroxylamine sulfate, hydrazine monohydrochloride, hydrazine dihydrochloride, hydrazine sulfate, hydrazine mono or dibromide, hydrazine mono or diiodide and hydroquinone together with at least one member selected from the group consisting of gluconodeltalactone, isomers of gluconodeltalactone, citric acid, salts of citric acid, ethylenediaminetetraacetic acid, salts of ethylenediaminetetraacetic acid, nitrilotriacetic acid, salts of nitrilotriacetic acid, hydroxyethylethylenediaminetriacetic acid and salts of hydroxyethylethylenediaminetriacetic acid and a catalytic amount of a solubilized salt of a compound capable of providing cupric, cuprous, nickel, zinc ions or mixtures thereof is incorporated into the aqueous fracturing fluid in order to prevent the deposition of iron in the subterranean formation. In this connection, there is no upper or lower limits to the amount of the admixture of these chemicals that can be added but generally a range of from about 2 pounds to 50 pounds per 1,000 gallons of aqueous fracturing fluid is preferred and, most preferably, from about 2 to about 20 pounds per 1,000 gallons of aqueous fracturing fluid together with a catalytic amount of the selected metallic ions capable of activating said composition. In most instances, from about 0.25 to 10 pounds per 1,000 gallons of fracturing fluid is sufficient to prevent the deposition of iron in the subterranean formation unless excessive aeration of the fracturing fluids occurs. The selected metallic ion generally should be present in an amount of at least about $4.7 \times 10^{-4}$ moles per liter of fracturing fluid to effect catalytic activation and preferably about $1.0 \times 10^{-2}$ moles per liter of fracturing fluid.

The solubilizable compound capable of providing the cupric, cuprous, nickel, zinc ions or mixtures thereof can comprise, for example, chloride, bromide, sulfate, acetate, lactate and the like salts of the metal ions. The only requirement being that the compound be in solution or solubilizable in the fluid containing the composition upon addition thereto and not adversely react with the other constituents of the fluid.

Preferably, the composition comprises from about 5 to about 95 precent by weight of the compound or compounds selected from the group consisting of hydroxylamine hydrochloride, hydroxylamine hydrobromide, hydroxylamine sulfate, hydrazine monohydrochloride, hydrazine dihydrochloride, hydrazine sulfate, hydrazine mono or dibromide, hydrazine mono or diiodide or hydroquinone. The balance of the composition preferably comprises at least one member selected from the group consisting of gluconodeltalactone, isomers of gluconodeltalactone, citric acid, salts of citric acid, ethylenediaminetetraacetic acid, salts of ethylenediaminetetraacetic acid, nitrilotriacetic acid, salts of nitrilotriacetic acid, hydroxyethylethylenediaminetriacetic acid and salts of hydroxyethylethylenediaminetriacetic acid. More preferably, the former compound or compounds comprise from about 10 to about 90 percent by weight of the composition and at least two of the latter compounds are present as the balance of the composition. A preferred admixture comprises hydroxylamine hydrochloride present in an amount of from about 30 to 50 percent by weight, citric acid or its salts present in an amount of from about 20 to 40 percent by weight and gluconodeltalactone present in an amount of from about 10 to 40 percent by weight. In a more preferred admixture, the hydroxylamine hydrochloride is present in an amount of from about 40 to 50 percent by weight, the citric acid or its salts is present in an amount of about 30 to 40 percent by weight and the gluconodeltalactone is present in an amount of about 10 to 20 percent by weight. The selected cupric, cuprous, nickel or zinc source of ions is present in an amount sufficient to effect activation of the composition to substantially prevent deposition of iron in the subterranean formation. Preferably the selected ion source comprises a solubilizable copper source present in an amount sufficient to provide a concentration of at least about $1.0 \times 10^{-2}$ moles per liter of fracturing fluid.

The fracturing fluid used in carrying out the invention can be water or a water-based fracturing fluid containing a gelling agent to increase the viscosity of said fluid. These water-based fracturing fluids are well known to those skilled in the art and can comprise nonacidic, weakly acidic and acidic fluids. Thus, for example, the fracturing fluid can comprise an aqueous liquid, a gelling agent, and a crosslinking compound. Suitable gelling agents which can be employed are, for example, galactomannans such as guar gum, gum karaya, gum tragacanth, gum ghatti, gum acacia, gum konjak, shariz, locus, psyllium, tamarind, gum tara, carrageenin, gum kauri, modified guars such as hydroxypropylguar, hydroxyethylguar, carboxymethylhydroxyethylguar, carboxymethylhydroxypropylguar, cellulose ethers such as carboxyethylcellulose, carboxymethylcellulose (CMC), carboxymethylhydroxyethylcellulose (CMHEC), hydroxyethylcellulose, hydroxypropylcellulose, methylhydroxypropylcellulose, methylcellulose, ethylcellulose, propylcellulose, and hydroxypropylmethylcellulose, polyacrylamides, polyacrylates, polysaccharides and alkoxylated amines such as:

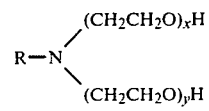

wherein R is selected from saturated and unsaturated aliphatic groups having the range of from about 8 to 22 carbon atoms and mixtures thereof and the average sum of the value of x and y in the mixture is in the range of about 0 to about 10 and the like and xanthan gum and the like. In addition, hydratable polymers capable of being crosslinked are suitable as gelling agents. Further details regarding the preparation and use of these polymers can be found in U.S. Pat. No. 4,021,355, the entire disclosure of which is incorporated by reference. A particularly effective gelling agent for carrying out the present invention is hydroxypropyl guar, cationic guars and the like which may be crosslinked with a number of different crosslinking agents.

The amount of thickening or gelling agent used in the fracturing composition of the invention can vary widely depending upon the viscosity, grade and purity of the gelling agent and the properties desired in said composition. In general, the amount of thickening or gelling agent used will be in the range of from about 1 to about several hundred pounds per 1000 gallons of fluid and, normally, from about 10 to about 50 pounds per 1000 gallons of fluid. There is, however, really no limit on the amount of gelling or thickening agent which can be used as long as the gelled composition can be pumped in accordance with the method of the invention.

The fracturing fluids can be prepared by mixing a predetermined quantity of the compound of the present invention with the fluid which is to be used in fracturing the formation. When the treatment fluid is substantially nonacidic, the sequestering agent can comprise an admixture of at least one member selected from the group consisting of hydroxylamine hydrochloride, hydroxylamine hydrobromide, hydroxylamine sulfate, hydrazine monohydrochloride, hydrazine dihydrochloride, hydrazine sulfate, hydrazine mono or dibromide, hydrazine mono or diiodide and hydroquinone together with a catalytic amount of a solubilized salt of a compound capable of providing cupric, cuprous, nickel, zinc ions or mixtures thereof.

If a crosslinked gel is to be used in the fracturing fluid for fracturing the formation, the crosslinked gel can be prepared for use by mixing a predetermined quantity of the gelling agent with a quantity of aqueous liquid to form a gel referred to herein as the base gel. Any conventional mixing apparatus can be employed for this purpose. In one embodiment, after the gelling agent and the aqueous liquid have been mixed for a time sufficient to form the base gel, the compound of the present invention is added to the base gel followed by the crosslinking compound. The mixture then is pumped into the well bore. Propping agents generally are added to the fracturing fluid. Propping agents which can be used in the practice of the invention include any of those known in the art, such as sand grains, walnut shell fragments, tempered glass beads, sintered or calcined bauxite, resin coated sand and the like.

The fracturing operations in accordance with the invention can be carried out in one or more stages. A stage can comprise the following steps. If desired, depending upon the well conditions, the injection of the aqueous fracturing fluid can be preceeded by a small slug of cleanup acid to remove scale, wax deposits, and so forth, and to clean the perforations. The cleanup acid, in order to keep the iron in solution, may contain the compound of the present invention to prevent the deposition of iron around the well bore. The fracturing fluid then is injected.

An acid injection can follow the injection of the fracturing fluid. The acid injection can be followed with an overflush of water to displace the acid. The second, and succeeding steps can comprise the same steps carried out in the same order. It is to be understood, however, that the fracturing is not limited to any particular combination of steps and the only essential step is the injection of the fracturing fluid under sufficient pressure to create the fracture.

Acidizing fluids used in carrying out the present invention are prepared in a similar manner. Any suitable aqueous acidic fluid such as are well known to those skilled in the art may be utilized.

The combination of low pH and the composition of the present invention, in the gelled fluids of the invention may increase the rate of degradation of the gelled fluids. It is, therefore, preferred that the gelled fluids be utilized as soon as possible after their preparation.

The composition of the present invention is a sequestering additive which prevents the deposition of iron in the pores of the formation during acidizing of the formation or removing acid soluble scale around the well bore.

The acidizing compositions of this invention for treating subterranean well formations containing iron compound deposits are comprised of an aqueous acid added to the above described sequestering agents.

The total amount of sequestering additive in the acidizing composition required to prevent precipitation of the iron compounds from the composition after becoming spent in the subterranean formation varies with the concentration of iron in the spent solution. However, in most applications, an additive concentration in the range of from about 5 pounds to about 100 pounds per 1,000 gallons of aqueous acid solution is sufficient and, preferably, from about 7 to about 70 pounds and, most preferably, from about 10 to about 50 pounds per 1000 gallons of aqueous acid solution.

The amount of the sequestering agent of the present invention is adjusted so that it is sufficient to substantially prevent the precipitation of the iron compounds from the spent aqueous acid solution and is sufficient to prevent the oxidation of ferrous ions to ferric ions in the composition of the invention. It is to be understood that the sequestering agent also may be used in combination with other compounds such as low molecular weight organic acids such as acetic acid, formic acid, mixtures thereof and the like.

Acids useful in the practice of the invention include any non-oxidizing acid which is effective in increasing the flow of fluids, such as hydrocarbons, through the formation and into the well. Thus, under proper conditions of use, examples of such acids include inorganic acids such as hydrochloric acid, hydrofluoric acid and mixtures thereof and mixtures of these inorganic acids with organic acids such as acetic acid, formic acid and combinations of acetic acid or formic acid with citric acid or the like. The concentration or strength of the acid can vary depending upon the type of acid, the type of formation being treated, and the results desired in the particular treating operation. The concentration can vary from about 1 to about 40 weight percent with concentrations within the range of 1 to 30 weight percent usually preferred, based on the total weight of the acidic composition. When hydrochloric acid is used, it is presently preferred to use an amount that is sufficient to provide an amount of hydrochloric acid within the range of from about 7½ to about 28 weight percent and, more preferably, about 15 weight percent based on the total weight of the acidic composition.

The acids used in the practice of the invention can contain any of the known corrosion inhibitors, de-emulsifying agents, surfactants, friction reducers, fluid-loss agents, gelling agents and the like which are known in the art.

While the manner of formulating and admixing the acidizing fluid is not believed critical, one method which may at times prove advantageous is to first add the sequestering agent to a predetermined quantity of water which is sufficient to dilute the acid to its desired strength for ultimate use. To this water is added the concentrated acid in such a manner as, for example, by agitation, to provide a uniform or homogeneous fluid; or if desired the sequestering agent can be added to the concentrated acid again in such a manner as, for example, by agitation to provide a uniform or homogeneous mixture and thereafter diluting the mixture with water to the desired strength prior to or at the time of application in the acidizing operation. Additional ingredients may be included in the fluid and may be added in any convenient manner in accordance with conventional practice. For example, gelling agents, corrosion inhibitors or de-emulsifying agents and the like may be premixed either with the acid or with the sequestering agent or in an aqueous solution thereof prior to being formulated into the acidizing fluid of the desired strength that is to be utilized in the acidizing operation. As can be appreciated, the amounts of the sequestering agent and the strength of the acid can be varied to obtain optimum results for any given acidizing operation.

The acidizing fluid, that is the solution containing the acid and the sequestering agent of the present invention, can be used to increase and restore the permeability of a zone or formation by being introduced into the formation containing the calcareous deposits via an injection into the well in any convenient manner as understood in the acidizing art. After the injection of the fluid into the deposits, the fluid attacks the calcareous deposits. The reaction usually is completed within 1 to 4 hours of the injection and thereafter the spent fluid may be withdrawn by pumping, swabbing or allowing the well to flow. Additionally, when the well is a disposal or injection well, the acidizing fluid can be introduced into the well in any convenient manner as understood in this art with the acid contacting the structures or strata to be treated and thereafter the spent fluid is displaced into the structures or strata by a displacing fluid, usually water.

The compositions of the present invention can be prepared on the surface in a suitable tank equipped with a suitable mixing means, and then pumped down the well and into the formation employing equipment for pumping acidic compositions. It is within the scope of the invention to prepare the composition by any suitable means known in the art.

The specific ingredients and the specific amount of each ingredient used in the composition of the present invention will depend on a number of factors. Among the factors to be considered are temperature, pressure, composition of the subterranean formation, the relative cost of ingredients, the type of operation involved, and the amount of iron deposits likely to be encountered in the well itself or on the surfaces of the equipment in the well or mixing and pumping equipment utilized in introducing the treatment fluids into the well.

In yet another embodiment of the invention, the sequestering agent of the present invention can be utilized in industrial cleaning applications such as, for example, in boiler cleaning, superheater cleaning, pipeline cleaning and the like where various alkaline or acidic cleaning fluids are utilized in contact with iron surfaces. The addition of the sequestering agent of the present invention to the cleaning fluid facilitates and enhances the rate of iron oxide scale removal from metal surfaces. The sequestering agent also reduces or substantially prevents ferric corrosion of equipment by reducing any ferric ions that are present to ferrous ions. The sequestering agent is utilized in an amount sufficient to effect an improved rate of iron oxide scale removal which generally will be an amount similar to that utilized in the acidizing fluids described hereinbefore. Such acidizing fluids are substantially similar to fluids often utilized in industrial cleaning applications. In many instances, various organic acids such as acetic acid, formic acid, and their salts may be utilized, as well as various mineral acids such as hydrochloric acid, sulfuric acid, phosphoric acid and the like are constituents of the industrial cleaning fluids.

The following examples will serve to illustrate the invention but should not be considered as unduly limiting the invention.

EXAMPLE I

In order to illustrate the advantageous use of the composition of the present invention, tests were carried out to compare the iron sequestering ability of various agents in acidic and fluids. In preparing for these tests, samples of 15% hydrochloric acid solution containing the composition to be tested in an amount equivalent to 50 pounds per 1000 gallons of acidic fluid and the designated iron concentration ($Fe^{+++}$) in solution were prepared and allowed to remain in contact at room temperature with Iceland Spar or marble chips until spent. The catalyst comprised $Cu^{++}$ ions present in an amount equivalent to 1 gallon of a 1 molar solution per 1000 gallons of acid solution. At the end of 6 and 24 hours, the solutions were inspected to determine whether or not the iron was retained in the solution. The results are set forth in the following Table I.

TABLE I

| Sample No. | Additive, Weight % | | | Results of Tests Having Initial Iron Solution, mpl $Fe^{+++}$ | | | | | |
|---|---|---|---|---|---|---|---|---|---|
| | | | | 1000 | | 3000 | | 5000 | |
| | hydroxylamine hydrochloride | citric acid | gluconodeltalactone | 6 hr | 24 hr | 6 hr | 24 hr | 6 hr | 24 hr |
| 1. | 90 | — | 10 | S[1] | S | S | S | S | S |
| 2. | 80 | 10 | 10 | — | — | — | — | — | — |
| 3. | 70 | 20 | 10 | S | S | S | S | S | S |
| 4. | 60 | 30 | 10 | S | S | S | S | S | S |
| 5. | 50 | 40 | 10 | S | S | S | S | S | S |
| 6. | 40 | 50 | 10 | S | S | S | C[2] | S | P[3] |
| 7. | 30 | 60 | 10 | S | S | S | S | P | P |
| 8. | 20 | 70 | 10 | S | S | S | S | P | P |
| 9. | 10 | 80 | 10 | S | S | S | S | S | C |
| 10. | — | 90 | 10 | S | C | P | P | P | P |
| 11. | 80 | — | 20 | S | S | C | P | P | P |
| 12. | 70 | 10 | 20 | S | S | S | S | S | S |
| 13. | 60 | 20 | 20 | S | S | S | S | S | S |
| 14. | 50 | 30 | 20 | S | S | S | S | S | S |
| 15. | 40 | 40 | 20 | S | S | S | S | S | S |
| 16. | 30 | 50 | 20 | S | S | S | C | P | P |
| 17. | 20 | 60 | 20 | S | S | S | S | P | P |
| 18. | 10 | 70 | 20 | S | S | C | P | P | P |
| 19. | 70 | — | 30 | S | S | S | S | S | S |
| 20. | 60 | 10 | 30 | S | S | S | S | S | S |
| 21. | 50 | 20 | 30 | S | S | S | P | S | P |
| 22. | 40 | 30 | 30 | S | S | S | S | C | P |
| 23. | 30 | 40 | 30 | S | S | S | S | P | P |
| 24. | 20 | 50 | 30 | S | S | S | S | P | P |
| 25. | 10 | 60 | 30 | S | S | C | C | P | P |
| 26. | 60 | — | 40 | S | S | S | S | S | C |
| 27. | 50 | 10 | 40 | S | S | S | S | S | S |
| 28. | 40 | 20 | 40 | S | S | S | S | S | S |
| 29. | 30 | 30 | 40 | S | S | S | S | C | C |
| 30. | 20 | 40 | 40 | S | S | S | S | P | P |
| 31. | 10 | 50 | 40 | S | S | S | C | P | P |
| 32. | 50 | — | 50 | S | S | S | S | S | S |
| 33. | 40 | 10 | 50 | S | S | S | S | S | S |
| 34. | 30 | 20 | 50 | S | S | S | S | P | P |
| 35. | 20 | 30 | 50 | S | S | S | S | P | P |
| 36. | 10 | 40 | 50 | S | S | P | P | P | P |
| 37. | 40 | — | 60 | S | S | S | S | C | C |
| 38. | 30 | 10 | 60 | S | S | S | S | P | P |
| 39. | 20 | 20 | 60 | S | S | S | S | P | P |
| 40. | 10 | 30 | 60 | S | S | P | P | P | P |
| 41. | 30 | — | 70 | S | S | S | C | S | C |
| 42. | 20 | 10 | 70 | S | S | P | P | P | P |
| 43. | 10 | 20 | 70 | S | S | P | P | P | P |
| 44. | 20 | — | 80 | S | S | C | P | P | P |
| 45. | 10 | 10 | 80 | S | S | P | P | P | P |
| 46. | 10 | — | 90 | S | S | P | P | P | P |

TABLE I-continued

| Sample No. | Additive, Weight % | | | Results of Tests Having Initial Iron Solution, mpl $Fe^{+++}$ | | | | | |
|---|---|---|---|---|---|---|---|---|---|
| | hydroxylamine hydrochloride | citric acid | gluconodeltalactone | 1000 | | 3000 | | 5000 | |
| | | | | 6 hr | 24 hr | 6 hr | 24 hr | 6 hr | 24 hr |
| 47. | 100 | — | — | P | P | P | P | P | P |
| 48. | — | 100 | — | P | P | P | P | P | P |
| 49. | — | — | 100 | P | P | P | P | P | P |

[1] All the iron remains in solution and the rock chips are clean.
[2] The solution is clear with a color change on the rock chips.
[3] A readily visible pricipitate is present on the rock chips.

The foregoing results clearly demonstrate the effectiveness of the composition of the present invention in preventing iron precipitation from spent acidic fluids containing dissolved iron.

EXAMPLE II

In order to illustrate the effectiveness of the catalysts of the present invention, various tests were carried out. In preparing for the tests, samples of 15% hydrochloric acid solution containing 3000 mpl $Fe^{+++}$ were mixed with the following compositions in the amount indicated and heated to 200° F. for 24 hours. The catalyst was admixed with the solution as a 1 molar solution in an amount of 1 gallon per 1000 gallons of acidic fluid. The acid then was spent as in Example I. The results are set forth in the following Table II.

TABLE II

| | Additive | | | |
|---|---|---|---|---|
| Sample No. | hydroxylamine hydrochloride weight % | citric acid weight % | Catalyst | Results |
| 1. | 50 | 50 | None | P[1] |
| 2. | 33 | 67 | None | P |
| 3. | 100 | 0 | None | P |
| 4. | 50 | 50 | $Cu^+$ | S[2] |
| 5. | 50 | 50 | $Cu^{++}$ | S |
| 6. | 50 | 50 | Ni | S |
| 7. | 50 | 50 | Zn | S |
| 8. | 50 | 50 | Co | P |
| 9. | 33 | 67 | $Cu^+$ | S |
| 10. | 33 | 67 | $Cu^{++}$ | S |
| 11. | 33 | 67 | Ni | S |
| 12. | 33 | 68 | Zn | S |
| 13. | 33 | 67 | Co | P |
| 14. | 100 | — | $Cu^+$ | P |
| 15. | 100 | — | $Cu^{++}$ | P |
| 16. | 100 | — | Ni | P |
| 17. | 100 | — | Zn | P |
| 18. | 100 | — | Co | P |

[1] A precipitate is on the rock chips.
[2] All iron remains in solution and the rock chips are clean.

The foregoing results clearly indicate that the presence of the various catalysts of the present invention is necessary to prevent undesirable precipitation of iron from the spent acid solutions.

EXAMPLE III

In order to illustrate the effectiveness of various compositions of the present invention in preventing precipitation of iron from an acidic solution, tests were carried out utilizing various constituents of the iron sequestering composition. In preparing for these tests, samples of 15% hydrochloric acid solution containing the composition to be tested in an amount equivalent to 50 pounds per 1000 gallons of acidic fluid and 3000 mpl of $Fe^{+++}$ were prepared. Tests were conducted with and without a catalyst. The catalyst, when present, comprised $Cu^{++}$ from cupric chloride present in an amount of 1 gallon of a 1 molar solution per 1000 gallons of acidic fluid. The solution was permitted to spend through contact with Iceland Spar or marble chips. The results after 24 hours at room temperature are set forth in Table III, below:

TABLE III

| Sample No. | Additive (wt %) | Catalyst | Results |
|---|---|---|---|
| 1. | hydroxylamine hydrochloride (50):citric acid (50) | No | P[1] |
| 2. | hydroxylamine hydrochloride (50):citric acid (50) | Yes | S[2] |
| 3. | hydroxylamine hydrochloride (40):citric acid (60) | No | P |
| 4. | hydroxylamine hydrochloride (40):citric acid (60) | Yes | S |
| 5. | hydroxylamine hydrochloride (60):citric acid (40) | No | P |
| 6. | hydroxylamine hydrochloride (60):citric acid (40) | Yes | S |
| 7. | hydroxylamine hydrochloride (50):ethylenediaminetetraacetic acid (50) | No | P |
| 8. | hydroxylamine hydrochloride (50):ethylenediaminetetraacetic acid (50) | Yes | S |
| 9. | hydroxylamine hydrochloride (50):nitrilotriacetic acid (50) | No | P |
| 10. | hydroxylamine hydrochloride (50):nitrilotriacetic acid (50) | yes | S |

[1] A precipitate is on the rock chips
[2] All iron remains in solution and the rock chips are clean.

The results clearly demonstrate the ability of the composition of the present invention to retain iron in a solution.

While the invention has described in terms of certain embodiments, and illustrated by examples, the skilled artisan will readily appreciate that various modifications, changes, substitutions and omissions may be made without departing from the spirit thereof. Accordingly, it is to be understood that the scope of the present invention is defined in the following claims.

What is claimed is:

1. A method of treating a subterranean formation containing iron comprising contacting a subterranean formation with an aqueous fluid containing a composition comprising an admixture of (i) at least one member selected from the group consisting of hydroxylamine hydrochloride, hydrazine monohydrochloride, hydroxylamine hydrobromide, hydroxylamine sulfate, hydrazine dihydrochloride, hydrazine sulfate, hydrazine monobromide, hydrazine dibromide, hydrazine monoiodide, hydrazine diiodide and hydroquinone together with (ii) at least one member selected from the group consisting of gluconodeltalactone, isomers of gluconodeltalactone, citric acid, salts of citric acid, ethylenediaminetetraacetic acid, salts of ethylenediaminetetraacetic acid, nitrilotriacetic acid, salts of nitrilotriacetic acid, hydroxyethylethylenediaminetriacetic acid, and salts of hydroxyethylethylenediaminetriacetic acid and (iii) a catalytic amount of a solubilized salt of a compound capable of providing at least one member selected from the group consisting of cupric, cuprous, nickel or zinc ions, said composition being present in an amount sufficient to substantially prevent the precipitation of ferric iron in said aqueous fluid during said contacting with said subterranean formation.

2. The method of claim 1 wherein said composition comprises an admixture of hydroxylamine hydrochloride, citric acid or its salts and gluconodeltalactone together with said catalytic amount of said solubilized salt capable of providing at least one member selected from the group consisting of cupric, cuprous, nickel or zinc ions and said hydroxylamine hydrochloride is present in an amount of from about 30 to 50 percent by weight, said citric acid or salts is present in an amount of from about 20 to 40 percent by weight and said gluconodeltalactone is present in an amount of from about 10 to 40 percent by weight of said admixture.

3. The method of claim 1 wherein said composition comprises an admixture of hydroxylamine hydrochloride and gluconodeltalactone and said hydroxylamine hydrochloride comrises from about 10 to 90 percent by weight of said admixture.

4. The method of claim 1 wherein said aqueous fluid contains a non-oxidizing acid.

5. The method of claim 1 wherein said catalytic ion which is present is selected from the group consisting of cupric and cuprous ions.

6. A method of acidizing a subterranean formation comprising:
contacting said formation with an aqueous acidic composition comprising a non-oxidizing acid present in an amount of from about 1 to about 40 percent by weight and a sequestering agent comprising an admixture of (i) at least one member selected from the group consisting of hydroxylamine hydrochloride, hydroxylamine hydrobromide, hydroxylamine sulfate, hydrazine monohydrochloride, hydrazine dihydrochloride, hydrazine sulfate, hydrazine monobromide, hydrazine dibromide, hydrazine monoiodide, hydrazine diiodide and hydroquinone together with (ii) at least one member selected from the group consisting of gluconodeltalactone, isomers of gluconodeltalactone, citric acid, salts of citric acid, ethylenediaminetetraacetic acid, salts of ethylenediaminetetraacetic acid, nitrilotriacetic acid, salts of nitrilotriacetic acid, hydroxyethylethylenediaminetriacetic acid, and salts of hydroxyethylethylenediaminetriacetic acid and (iii) a catalytic amount of a solubilized salt of a compound capable of providing at least one member selected from the group consisting of cupric, cuprous, nickel or zinc ions, said sequestering agent being present in said aqueous acidic composition in an amount sufficient to sequester at least a portion of any ferric iron present.

7. The method of claim 6 wherein said non-oxidizing acid is selected from the group consisting of hydrochloric acid, hydrofluoric acid and mixtures thereof.

8. The method of claim 6 wherein said sequestering agent comprises an admixture of hydroxylamine hydrochloride, citric acid or its salts and gluconodeltalactone or its isomers together with said catalytic amount of said solubilized salt capable of providing at least one member selected from the group consisting of cupric, cuprous, nickel or zinc ions and said hydroxylamine hydrochloride is present in an amount of from about 30 to 50 percent by weight, said citric acid or salts is present in an amount of from about 20 to 40 percent by weight and said gluconodeltalactone or isomer thereof is present in an amount of from about 10 to 40 percent by weight of said admixture.

9. The method of claim 6 wherein said sequestering agent comprises an admixture of hydroxylamine hydrochloride and gluconodeltalactone and said hydroxylamine hydrochloride comrises from about 10 to 90 percent by weight of said admixture.

10. The method of claim 6 wherein said sequestering agent is present in an amount of from about 10 to about 50 pounds per 1000 gallons of aqueous acidic composition.

11. A method of fracturing a subterranean formation comprising:
introducing into said formation a substantially non-acidic aqueous fracturing composition at a flow rate and pressure sufficient to produce at least one fracture in said formation, said fracturing composition comprising an aqueous fluid and a sequestering agent comprising an admixture of (i) at least one member selected from the group consisting of hydroxylamine hydrochloride, hydroxylamine hydrobromide, hydroxylamine sulfate, hydrazine monohydrochloride, hydrazine dihydro-chloride, hydrazine sulfate, hydraxine monobromide, hydrazine di bromide, hydrazine monoiodide, hydrazine diiodide and hydroquinone togehter with (ii) a catalytic amount of a solubilized salt of a compound capable of providing cupric, cuprous, nickel or zinc ions, said sequestering agent being present in an amount sufficient to sequester at least a portion of any ferric iron present.

12. A method of fracturing a subterranean formation comprising: introducing into said formation an acidic aqueous fracturing composition at a flow rate and pressure sufficient to produce at least one fracture in said formation, said fracturing composition comprising an aqueous fluid and a sequestering agent comprising an admixture of (i) at least one member selected from the group consisting of hydroxylamine hydrochloride, hydroxylamine hydrobromide, hydroxylamine sulfate, hydrazine monohydrochloride, hydrazine dihydrochloride, hydrazine sulfate, hydrazine monobromide, hydrazine dibromide, hydrazine monoiodide, hydrazine diiodide and hydroquinone together with (ii) at least one member selected from the group consisting of gluconodeltalactone, isomers of gluconodeltalactone, citric acid, salts of citric acid, ethylenediaminetetraacetic acid, salts of ethylenediaminetetraacetic acid, nitrilotriacetic acid, salts of nitrilotriacetic acid, hydroxylethylethylenediaminetriacetic acid and salts of hydroxylethylethylenediaminetriacetic acid and (iii) a catalytic amount of a solubilized salt of a compound capable of providing cupric, cuprous, nickel or zinc ions, sequestering agent being present in an amount sufficient to sequester at least a portion of any ferric iron present.

13. The method of claim 12 wherein said non-oxidizing acid is selected from the group consisting of hydrochloric acid, hydrofluoric acid and mixtures thereof.

14. The method of claim 12 wherein said sequestering agent comprises an admixture of hydroxylamine hydrochloride, citric acid or its salts and gluconodeltalactone together with said solubilized salt of said compound capable of providing cupric, cuprous, or nickel or zinc ions and said hydroxylamine hydrochloride is present in an amount of from about 30 to 50 percent by weight, said citric acid or salts is present in an amount of from about 20 to 40 percent by weight and said gluconodeltalactone is present in an amount of from about 10 to 40 percent by weight of said admixture.

15. The method of claim 12 wherein said sequestering agent comprises an admixture of hydroxylamine hydrochloride and gluconodeltalactone together with said solubilized salt of said compound capable of providing cupric, cuprous, nickel or zinc ions and said hydroxylamine hydrochloride comprises from about 10 to 90 percent by weight of said admixture.

16. The method of claim 12 wherein said sequestering agent is present in an amount of from about 5 to about 100 pounds per 1000 gallons of aqueous acidic composition.

17. The method of claim 12 wherein said non-oxidizing acid is present in said aqueous fluid in an amount of from about 1 to about 40 percent by weight.

18. The method of claim 11 wherein said aqueous fracturing composition contains a gelling agent.

19. The method of claim 18 wherein said gelling agent is selected from the group consisting of:
guar gum, gum karaya, gum tragacanth, gum ghatti, xanthan gum gum acacia, gum konjak, shariz, locus, psyllium, tamarind, gum tara, carrageenin, gum kauri, hydroxypropylguar, hydroxyethylguar, carboxymethylhydroxyethylguar, carboxymethylhydroxypropylguar, carboxyethylcellulose, carboxymethylcellulose (CMC), carboxymethylhydroxyethylcellulose (CMHEC), hydroxyethylcellulose, hydroxypropylcellulose, methylhydroxypropylcellulose, methylcellulose, ethylcellulose, propylcellulose, hydroxypropylmethylcellulose, polyacrylamides, polyacrymates, polysaccharides and alkoxylated amines having the general formula:

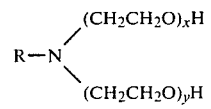

wherein R is selected from saturated and unsaturated aliphatic groups having the range of from about 8 to 22 carbon atoms and mixtures thereof and the average sum of the value of x and y in the mixture is in the range of about 0 to about 10.

20. The method of claim 11 wherein said aqueous fracturing composition is preceded with an acid flush said flush containing a non-oxidizing acid and a composition comprising an admixture of (i) at least one member selected from the group consisting of hydroxylamine hydrochloride, hydroxylamine hydrobromide, hydroxylamine sulfate, hydrazine monohydrochloride, hydrazine dihydrochloride, hydrazine sulfate, hydrazine monobromide, hydrazine dibromide, hydrazine monoiodide, hydrazine diiodide, and hydroquinone together with (ii) at least one member selected from the group consisting of gluconodeltalactone, isomers of gluconodeltalactone, citric acid, salts of citric acid, ethylenediaminetetraacetic acid, salts of ethylenediaminetetraacetic acid, nitrilotriacetic acid, salts of nitrilotriacetic acid, hydroxyethylethylenediaminetriacetic acid and salts of hydroxyethylethylenediaminetriacetic acid and (iii) a catalytic amount of a solubilized salt of a compound capable of providing at least one member selected from the group consisting of cupric, cuprous, nickel or zinc ions;

said acid flush containing a sufficient quantity of said composition to prevent the precipitation of iron.

* * * * *